J. ROSS.
RIGGER'S TRUCK.
APPLICATION FILED DEC. 30, 1908.
927,879.
Patented July 13, 1909.
2 SHEETS—SHEET 1.
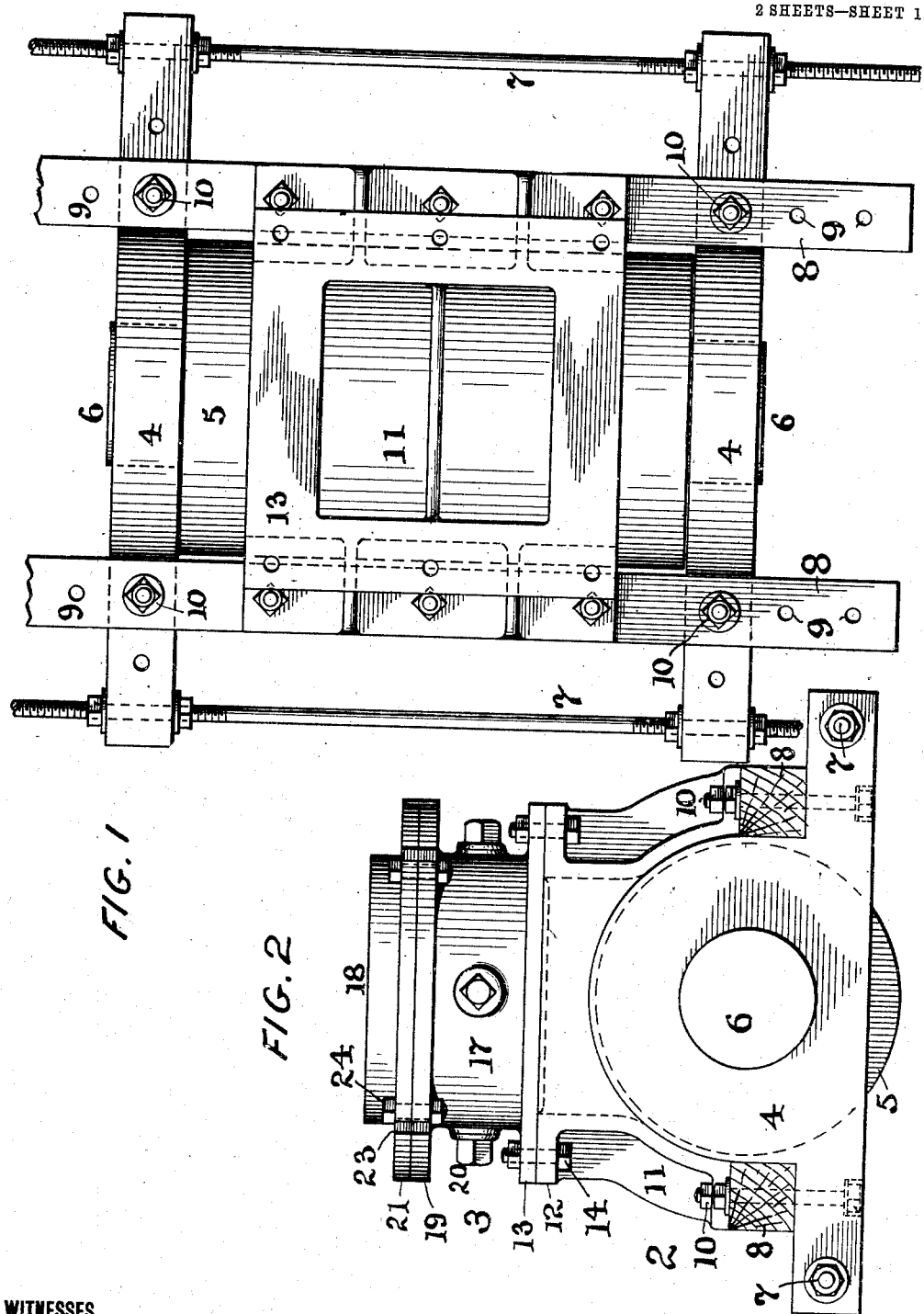
FIG. 1
FIG. 2
WITNESSES
R. M. Kelly
A. Rettig
INVENTOR
John Ross
BY
ATTORNEY

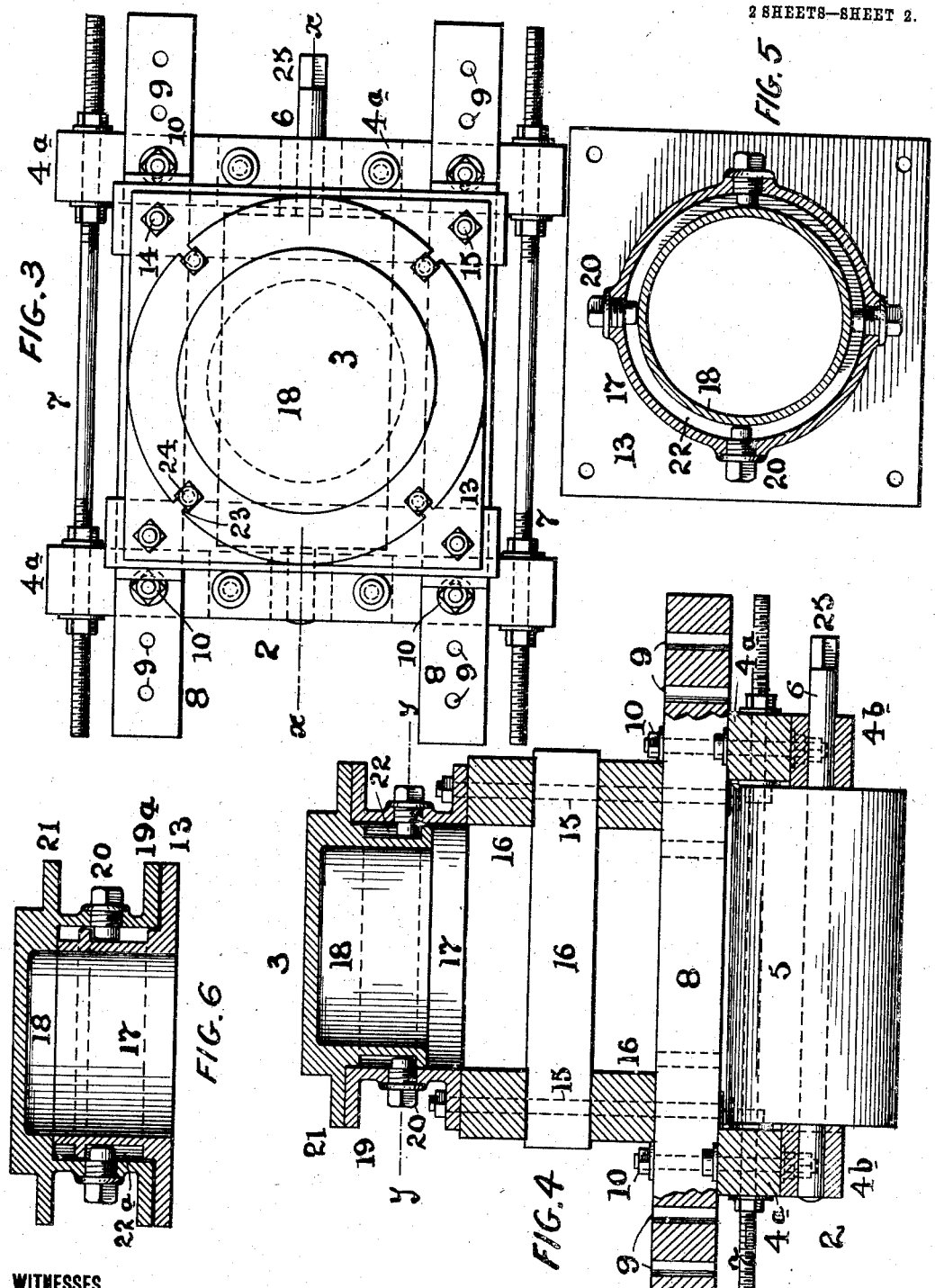

UNITED STATES PATENT OFFICE.

JOHN ROSS, OF PHILADELPHIA, PENNSYLVANIA.

RIGGER'S TRUCK.

No. 927,879.  Specification of Letters Patent.  Patented July 13, 1909.

Application filed December 30, 1908. Serial No. 470,004.

*To all whom it may concern:*

Be it known that I, JOHN ROSS, a citizen of the United States, and a resident of the city and county of Philadelphia, State of Pennsylvania, have invented an Improvement in Riggers' Trucks, of which the following is a specification.

My invention of rigger's truck consists of certain improvements which are fully set forth in the following specification and shown in the accompanying drawings which form a part thereof.

The object of my invention is to provide a rigger's truck designed for supporting buildings or large objects for transportation over roadways, having great strength and adjustability to suit the requirements.

My invention consists essentially of a truck combined with a turn table supported by the truck and upon which the load directly rests, the truck being adjustable as to its width for the purpose of being able to change the length of the roller to be used to suit the varying loads which have to be supported.

My invention further consists in a rigger's truck provided with a turn table which consists of two cylindrical portions sleeved one within the other and having flanged portions and one of the sleeve portions provided with an annular groove, combined with one or more studs adjustably connecting with the other of the sleeve portions and having their ends extended into an annular groove.

My invention further consists of details of construction which together with the features above specified will be better understood by reference to the drawings, in which:

Figure 1 is a plan view of a rigger's truck embodying my invention; Fig. 2 is an end elevation of the same; Fig. 3 is a plan view of a rigger's truck showing a modification of my invention; Fig. 4 is a sectional elevation of the same on line $x$—$x$ of Fig. 3; Fig. 5 is a sectional plan view through the turn table on line $Y$—$Y$ of Fig. 4; Fig. 6 is a sectional elevation of a modified form of the turn table.

2 is the truck and 3 is the turn table which is mounted upon the truck.

Referring to Figs. 1 and 2 the truck consists of two bearing frames 4 in which the roller 5 is journaled at 6. These bearing frames 4 are connected or spaced by bolts 7 which are adjustable as to their length.

Resting upon the two bearing frames 4 are two beams 8 which have a series of holes 9 and are screwed to the end bearing frames 4 by bolts 10. These beams 8 are parallel to the roller 5 and if a long roller is to be employed the bolts 10 are removed and the bearing frames 4 separated from the roller by disconnecting one end of the bolt 7. After inserting a new roller in place the bearing frames 4 are again secured in proper relative position by the bolt 7 and to the beams 8 by the bolts 10 passing through the new holes 9 which have been brought into position, as will readily be understood by reference to Fig. 1. If desired, instead of having the spacing bolts 7 long so as to project at each end, a series of spacing bolts may be provided with the truck, one set to suit each length of roller which goes with the truck. The construction shown would give capacity for three sizes of rollers but it is evident that it may have a greater capacity if so desired by simply employing more holes 9. Supported upon the beams 8 is a pedestal frame 11 which extends over the roller 5 and is provided with a flanged top 12 upon which the base flange 13 of the turn table 3 rests and to which it is clamped by bolts 14. The turn table may be of any suitable construction but that shown in this application is a preferred construction, and will be presently described. The turn table is arranged centrally over the roller 5 and no matter what the adjustment of the frames 4 and 8 may be to suit different length of rollers the central position of the turn table is maintained.

Referring now to the construction of the truck shown in Figs. 3 and 4 we have the same general capacity for adjustment though the construction is not quite as solid as that of Figs. 1 and 2. In this modified form of the truck 2, beams 4ª are provided with the bearings 4ᵇ in which the roller 5 is journaled at 6. These beams 4ª are connected by the spacing bolts 7 as in Fig. 1, and are also connected to two parallel beams 8 having holes 9 and similar to the corresponding beams in Fig. 1. Bolts 10 connect these beams 8 with the cross beams 4ª. The beams 8 are provided with a series of holes 9, not only for the bolts 10 but also for the bolts 15 which extend down from the base flange 13 of the turn table and through a series of crossing beams 16 resting upon the beams 8 and by which the turn table may be supported at any elevation desired. I have shown three sets of these crossing beams 16 but there may be any number of these sets, or if desired, they may be omitted and the turn table be bolted directly upon the beams 8. If desired, this method of raising the turn table relatively to the ground may also be adopted in connection with the construction shown in Figs. 1 and 2 by simply interposing beams 16 between the base 13 of the turn table and the flange 12 of the pedestal, as will be readily understood. Whether the beams 16 are used at all, or if used, the number so used, is dependent wholly upon the distance between the load and the road-way, and their employment is dependent solely upon the judgment of the rigger in charge of the work. The roller 5 may be changed or substituted by a roller of greater or less length in the construction of Figs. 3 and 4, just as a similar substitution may be made in the construction shown in Figs. 1 and 2.

Referring now to the turn table construction, it will be seen that it comprises a lower part 17 having the flange 13 by which it is supported and secured in position, and an upper part 18 which is sleeved upon the lower part and adapted to be rotatably supported thereon. In Figs. 4 and 5 the construction shown is such that the lower frame 17 is provided, not only with the lower flange 13 but with an upper flange 19 also and a series of screw studs 20. The upper frame 18 is provided with a flange 21 resting upon the flange 19 of the lower frame and has also a downwardly extending cylindrical body which forms a sleeve connection within the cylindrical body of the lower frame 17, so that the upper frame may rotate about a vertical axis, or more correctly stated, the lower frame with the truck may be rotated about a vertical axis under the upper frame and the load. To prevent the two frames 17 and 18 becoming separated the upper frame is provided with an annular groove 22 into which the studs 20 extend. This groove 22 might otherwise be described as a flanged portion of the body of the upper part which extends under the studs and prevents the upper part of the turn table from riding upward upon the lower part. These screw studs 20 may be screwed outward when it is desired to separate the two parts 17 and 18 for repairs, lubrication or otherwise. Instead of sleeving the two parts 17 and 18 together with the body of the part 18 within the body of the part 17, as shown in Fig. 4, the reverse of this construction may be employed, as indicated in Fig. 6. In this case, the lower part 17 has a flange 13 and is provided with the groove 22$^a$. The upper part 18 is sleeved over the part 17 and is provided with flanges 21 and 19$^a$. The studs 20 are in this case carried by the upper frame instead of by the lower frame and coöperate with the annular groove 22$^a$ in the lower frame. It will be evident that there is no material difference between the construction and mode of operation of the parts 17 and 18, whether made as shown in Fig. 4 or as shown in Fig. 6. The flanges 19 and 21 of the two frames 17 and 18 are provided with notches 23 which when in alinement may receive clamping bolts 24 when it is desired to prevent the two parts of the turn table having relative rotation one to the other, such as when moving a house in a straight line down a street. There may be any number of these notches 23 on either or both flanges as desired, 4 being shown. This turn table construction has great stability and no tipping or tilting of the load can displace the parts. No strain comes upon the screw studs 20 when the load is being carried, their function being simply to retain the two parts in operative relation when the mechanism is being shipped or assembled, or handled generally.

It is evident that my improved turn table may be employed with any form of truck desired and therefore while I prefer the truck with the capacity for adjusting the rollers, I do not restrict myself to that type of truck for use in connection with my improved turn table feature.

In Figs. 1 and 2 I have shown the supporting roller 5 without an extending axle by which to rotate it, but in those cases where the truck is to be propelled by rotating the roller through a lever, this result may be accomplished by having the bearing 6 extended outward and provided with a polygonal end 25 upon which a wrench may be attached. In this case the axle would be secured to the roller, but otherwise the axle and roller may be independent if so desired.

I have shown my improved rigger's truck in the form which I prefer for commercial use, but I do not restrict myself to the exact form shown, as it may be modified; for example, it is evident that while I have shown bolts for adjustably uniting the beams 8 to the end frames 4 and 4$^a$, any other means may be employed for adjustably securing these parts together, also that while I have shown the beams 8 and 16 rectangular in cross section, they may be of any other cross section and made of wood or metal, as desired, also the shape of the pedestal or bridging part 11 may be of any shape or construction desired so long as it extends or bridges over the roller 5 and is sustained by the end bearing frames through the beams 8.

More specifically referring to the construction shown in Figs. 1 and 2, it is evident that while the pedestal 11 is shown as made of one integral casting, this is not at all necessary, as the bridging and pedestal effect may be secured by making the part between the beams 8 and turn table in parts secured together, as illustrated in a general way by the structure shown in Figs. 3 and 4. It is also to be understood that while the pedestal 11 is shown as bolted to the beams 8, the same results would be secured if it were formed integral with said beams. For economy of construction, however, it is best to make the pedestal separate from the beams and bolt it to them as shown. It is also to be understood that while I have shown and prefer to use the spacing bolts 7, the same may be dispensed with when desired.

The general construction of the truck as shown is preferred, but I wish to be understood that I am not to be confined to the details as these may be modified without departing from the spirit of the invention.

Having now described my invention what I claim as new and desire to secure by Letters Patent, is:

1. In a rigger's truck a combination of a truck portion, and a turn table portion supported by the truck portion, and in which the truck portion consists of two end bearing frames, a roller arranged between said end bearing frames and journaled therein, two parallel beams detachably secured to the two end bearing frames, and means for adjusting the end bearing frames to or from each other and securing them to the parallel beams, whereby rollers of different length may be substituted to suit the load to be supported.

2. In a rigger's truck a combination of a truck portion, and a turn table portion supported by the truck portion, and in which the truck portion consists of two end bearing frames, a roller arranged between said end bearing frames and journaled therein, two parallel beams detachably secured to the two end bearing frames, and means for adjusting the end bearing frames to or from each other and securing them to the parallel beams, said means consisting of a plurality of bolt holes along the parallel beams and detachable bolts passing through the end bearing frames and the bolt holes of the beams whereby rollers of different length may be substituted to suit the load to be supported.

3. In a rigger's truck a combination of a truck portion, and a turn table portion supported by the truck portion, and in which the truck portion consists of two end bearing frames, a roller arranged between said end bearing frames and journaled therein, two parallel beams detachably secured to the two end bearing frames, supporting means between the parallel beams and the under part of the turn table and extending to a level above the roller, and means for adjusting the end bearing frames to or from each other and securing them to the parallel beams, whereby rollers of different length may be substituted to suit the load to be supported.

4. In a rigger's truck a combination of a truck portion, and a turn table portion supported by the truck portion, and in which the truck portion consists of two end bearing frames, a roller arranged between said end bearing frames and journaled therein, two parallel beams detachably secured to the two end bearing frames, a pedestal bolted to the parallel beams and bridging over the roller and supporting the turn table, and means for adjusting the end bearing frames to or from each other and securing them to the parallel beams, whereby rollers of different length may be substituted to suit the load to be supported.

5. In a rigger's truck a combination of a truck portion, and a turn table portion supported by the truck portion, and in which the truck portion consists of two end bearing frames, a roller arranged between said end bearing frames and journaled therein, two parallel beams detachably secured to the two end bearing frames, adjustable spacing bolts for connecting the end bearing frames independently of the parallel beams, and means for adjusting the end bearing frames to or from each other and securing them to the parallel beams, whereby rollers of different length may be substituted to suit the load to be supported.

6. A rigger's truck consisting of two end bearing frames, a roller arranged between said end bearing frames and journaled therein, two parallel beams detachably secured to the two bearing frames, and means for adjusting the end bearing frames to or from each other and securing them to the parallel beams, whereby rollers of different length may be substituted to suit the load to be supported.

7. A rigger's truck consisting of two end bearing frames, a roller arranged between said end bearing frames and journaled therein, two parallel beams detachably secured to the two end bearing frames, and means for adjusting the end bearing frames to or from each other and securing them to the parallel beams, said means consisting of a plurality of bolt holes along the parallel beams and detachable bolts passing through the end bearing frames and the bolt holes of the beams, whereby rollers of different length may be substituted to suit the load to be supported.

8. A rigger's truck consisting of two end bearing frames, a roller arranged between said end bearing frames and journaled therein, two parallel beams detachably secured to the two end bearing frames, a pedestal bolted to the parallel beams and bridging over the roller and adapted to support the load, and means for adjusting the end bearing frames to or from each other and securing them to the parallel beams, whereby rollers of different length may be substituted to suit the load to be supported.

9. In a rigger's truck, the truck portion having a roller, combined with a turn table consisting of upper and lower parts sleeved together so as to relatively rotate about a vertical axis and in which one of said parts is provided with an annular groove or recess and the other of said parts provided with one or more adjustable retaining studs extending into the groove or recess for preventing the disconnection of the two parts of the turn table.

10. In a rigger's truck, the truck portion having a roller, combined with a turn table consisting of upper and lower parts sleeved together so as to relatively rotate about a vertical axis and in which one of said parts is provided with an annular groove or recess and the other of said parts provided with one or more adjustable retaining studs extending into the groove or recess for preventing the disconnection of the two parts of the turn table, said upper and lower parts being further each provided with a flange, and detachable bolts extending through the flanges for locking the two parts of the turn table against relative adjustment about the vertical axis.

11. In a rigger's truck, the truck portion having a supporting roller, combined with a turn table above the truck consisting of upper and lower parts sleeved together and relatively rotatable with respect to each other, the lower frame being provided with a bottom flange and in which further, the two parts of the turn table are held with provision for complete rotation and against separation by means consisting of an annular groove extending circumferentially entirely about one of said parts and projecting means on the other of said parts engaging the said groove.

12. In a rigger's truck, the truck portion having a supporting roller, combined with a turn table above the truck consisting of upper and lower parts sleeved together and relatively rotatable with respect to each other, the lower frame being provided with a bottom flange and in which further, the two parts of the turn table are held against separation by means consisting of an annular groove on one of said parts and projecting means secured to the other of said parts below its upper surface and engaging the said groove, and means for temporarily securing the two parts of the turn table against relative rotation.

13. In a rigger's truck, the combination of two end frames, a roller journaled with respect to and between said end frames, two parallel beams secured to the end frames and substantially parallel to the axis of the roller, and an integral bridging support for the load secured to the parallel beams intermediate of the end frames and extending over the roller.

14. In a rigger's truck, the combination of two end frames, a roller journaled with respect to and between said end frames, two parallel beams secured to the end frames and substantially parallel to the axis of the roller, a bridging support for the load secured to the parallel beams and extending over the roller, and a turn table secured to the top of the bridging pedestal to receive the thrust of the load and transmit it to the pedestal.

15. In a rigger's truck, the combination of two end frames, a roller journaled with respect to and between said end frames, two parallel beams adjustably secured to the end frames and substantially parallel to the axis of the roller for extending the length of the truck to enable a longer roller to be used to suit the load, and a bridging support for the load secured to the parallel beams and extending over the middle part of the roller.

16. In a rigger's truck a lower or truck portion comprising a frame and a roller journaled within the frame, combined with a bridging support for the load of less length than the roller extending over the roller transversely of its length and secured to the frame at opposite sides of the roller.

17. In a rigger's truck, the combination of a roller, a frame structure extending over the curved and central portion of the roller and supported by the roller, and a turn table carried upon the frame structure at an elevation above the roller.

18. In a rigger's truck, a roller, combined with a frame structure journaled thereon having an upwardly curved lower portion into which the central portion of the roller extends, and a turn table structure supported by the frame structure at an elevation above the central portion of the roller.

In testimony of which invention, I hereunto set my hand.

JOHN ROSS.

Witnesses:
R. M. HUNTER,
R. M. KELLY.